United States Patent [19]

Wakabayashi et al.

[11] Patent Number: 4,825,235
[45] Date of Patent: Apr. 25, 1989

[54] CAMERA HAVING SOFT FOCUS FILTER

[75] Inventors: Hiroshi Wakabayashi, Yokohama; Kazuyuki Kazami, Tokyo; Toshio Sosa, Narashino; Hidenori Miyamoto, Ichikawa, all of Japan

[73] Assignee: Nikon Corporation, Tokyo, Japan

[21] Appl. No.: 132,565

[22] Filed: Dec. 11, 1987

Related U.S. Application Data

[63] Continuation of Ser. No. 46,700, May 7, 1987, abandoned.

[30] Foreign Application Priority Data

| May 9, 1986 | [JP] | Japan | 61-106222 |
| May 12, 1986 | [JP] | Japan | 61-108343 |
| Jul. 4, 1986 | [JP] | Japan | 61-158581 |
| Jul. 15, 1986 | [JP] | Japan | 61-165988 |
| Aug. 22, 1986 | [JP] | Japan | 61-196838 |
| Nov. 27, 1986 | [JP] | Japan | 61-283922 |
| Feb. 24, 1987 | [JP] | Japan | 62-40536 |

[51] Int. Cl.$^4$ .............. G03B 3/00; G03B 11/00; G02B 13/20
[52] U.S. Cl. .............. 354/195.12; 350/431
[58] Field of Search .............. 354/288, 202, 270, 295, 354/296, 195.12, 195.1; 352/85; 350/431, 432, 437, 438, 439; 358/22, 225

[56] References Cited

U.S. PATENT DOCUMENTS

| 1,460,744 | 7/1923 | Boysen | 354/295 X |
| 2,353,257 | 7/1944 | Mihalyi | 354/195.1 |
| 4,013,347 | 3/1977 | Nakamura | 354/296 X |
| 4,586,802 | 5/1986 | Nagano et al. | 354/295 X |
| 4,681,418 | 7/1987 | Kodaira | 354/288 |
| 4,682,227 | 7/1987 | Heerah | 358/22 X |

FOREIGN PATENT DOCUMENTS

| 114126 | 7/1982 | Japan | 354/195.1 |
| 195633 | 11/1984 | Japan | 354/195.1 |

Primary Examiner—W. B. Perkey
Attorney, Agent, or Firm—Shapiro and Shapiro

[57] ABSTRACT

A camera comprises a photographing optical system in which a focal length thereof is changed between a predetermined focal length range including a first focal length and a second focal length longer than the first focal length, a soft focus filter optical member, means for holding the optical member to be switched between an insertion position where the optical member is inserted in an optical path of the photographing optical system and a removal position where the optical member is removed from the optical path, and means for biasing the optical member to the removal position when the photographing optical system is located at the first focal length and the optical member to the insertion position when the photographing optical system is located at the second focal length.

10 Claims, 12 Drawing Sheets

CAMERA HAVING SOFT FOCUS FILTER

This is a continuation application of Ser. No. 46,700, filed May 7, 1987, now abandoned.

BACKGROUND OF THE INVENTION

1. Field of the Invention

The present invention relates to a soft focus filter and a camera using an auxiliary optical system such as the soft focus filter. More particularly, the present invention relates to a camera which allows switching between focal lengths and has an auxiliary optical system interlocked with switching of the focal length.

2. Related Background Art

Various types of compact cameras are commercially available and are popular. These compact cameras can be easily carried by users and have many functions such as automatic exposure control, automatic focus control, and flashing. In order to develop a multifunction camera which satisfies a variety of applications, multi-functional compact cameras such as bi-focal cameras are developed and commercially available on the market. In these compact cameras, an aperture/lens shutter is employed in a photographing lens so as to make the camera body compact and lightweight. In addition, some of such cameras have auxiliary optical systems such as a soft focus filter and a soft focus lens.

The soft focus filter and the soft focus lens aim at producing a soft image of an object to be photographed. Soft-tone photographing is an effective technique in portrait pictures or the like. An example of a soft focus filter is prepared by randomly forming small projections on the surface of a transparent substrate, thereby obtaining a soft focus effect. The soft focus lens is prepared by intentionally increasing aberration to provide a soft focus effect. An example of the soft focus lens is a variable aberration lens in which only spherical aberration can continuously vary.

The soft focus filter is effectively used in long-focus photographing in which only a person to be photographed is focused. In particular, the soft focus filter is effectively used together with a 70- to 80-mm portrait lens. However, short-focus photographing such as wide-angle photographing is rarely used to focus only a person to be photographed since the background cannot be out of focus and the person cannot be emphasized. Therefore, the soft focus filter is not always effective in wide-angle photographing. If the soft focus filter is used too frequently, an observer may feel poor performance of the lens and bad effects such as defocusing. Moreover, the observer may feel the soft-tone pictures are too artificial to appreciate.

SUMMARY OF THE INVENTION

It is an object of the present invention to provide an insertion/retraction apparatus for attaching a soft focus filter to a camera body or detaching it therefrom according to photographing conditions of the camera to obtain natural effects.

It is another object of the present invention to provide a bi-focal camera in which an auxiliary optical system can be smoothly and accurately inserted into an optical axis or removed therefrom without adversely affecting sublens insertion upon switching between the focal lengths.

It is still another object of the present invention to provide an insertion/retraction apparatus for automatically removing an auxiliary optical system from a photographing optical path upon completion of photographing.

DESCRIPTION OF THE PREFERRED EMBODIMENTS

Figure 1:
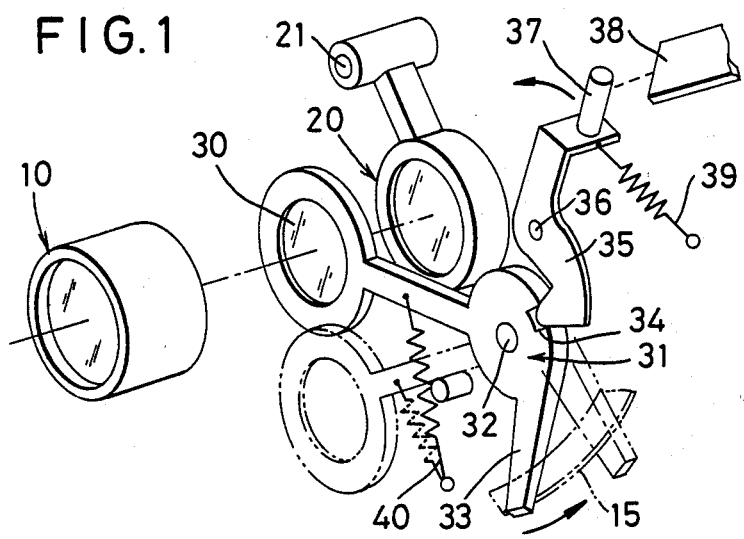
FIG. 1 is a perspective view showing a main part of a lens assembly according to a first embodiment of the present invention.

FIG. 1 shows a first embodiment of the present invention. A housing (not shown) of a lens assembly of a camera includes a main lens 10 and a focal-length switching as changing subline 20. A soft focus filter 30 is arranged in a photographing optical path of the main lens 10. As is apparent from FIG. 2, an aperture/shutter 42, the soft focus filter 30, and the sublens 20 are arranged between the main lens 10 and a film surface 44 from the side of the main lens 10.

The sublens 20 is pivotally supported by a shaft 21 and can be inserted by a switching mechanism (not shown) in the photographing optical path and held therein. When the sublens 20 is inserted in the photographing optical path, the camera is set in the telephoto photographing mode as the long-focus photographing mode. As indicated by the alternate long and two short dashed line in FIG. 2, when the sublens 20 is not inserted in the photographing optical path, the camera is set in the wide-angle photographing mode as short-focus photographing.

The soft focus filter 30 is mounted on the distal end of a holding member 31. The holding member 31 is pivotally supported by a housing through a shaft 32 extending parallel to the optical axis. The filter 30 is biased by a biasing spring 40 such that the filter 30 is removed from the photographing optical path.

The proximal end of the holding member 31 has a disk-like shape, and an operation lever 33 extends from this proximal end to the peripheral portion of the housing. More specifically, the distal end of the operation lever 33 extends outside the housing through a slot 15 and serves as an operation knob.

A notch 34 is formed near the proximal end of the holding member 31.

A lock lever 35 is pivotally supported by the housing through a shaft 36 and has a distal end which can be engaged with the notch 34.

A follower pin 37 which can be engaged with a cam lever 38 extends on the distal end of the other arm of the lock lever 35.

The lock lever 35 is biased by a spring 39 in a direction where the lever 35 is engaged with the notch 34. When the follower pin 37 abuts against the inclined surface of the distal end of the cam lever 38, the lock lever 35 is rotated in the direction indicated by an arrow in FIG. 1 and is thus disengaged from the notch 34.

The operation of the first embodiment will be described below.

FIG. 1 shows a state wherein the camera is set in the telephoto photographing mode. The sublens 20 and the filter 30 are inserted in the photographing optical path.

Since the follower pin 37 is separated from the cam lever 38, the lock lever 35 is engaged with the notch 34 by the biasing force of the spring 39 and is engaged with the notch 34. Therefore, the filter 30 can be held to be inserted in the photographing optical path.

Figure 2:
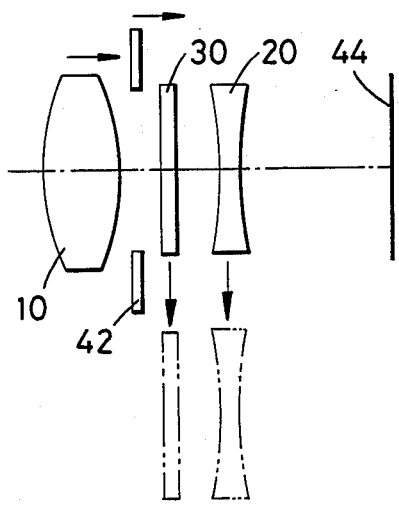
FIG. 2 is a schematic view of an optical system.

The disposition of the optical system in the state is indicated by the solid line in FIG. 2. An object to be photographed is photographed on the film surface 44 through the filter 30. Unless the filter 30 is intentionally removed from the photographing optical path, photographing is performed using the soft focus filter.

In order to remove the filter 30 from the photographing optical path, the user moves the operation lever 33 in the direction of the arrow. The lock lever 35 is disengaged from the notch 34. When the user continuously moves the operation lever 33 to the other end of the slot 15, the holding member 31 is pivoted to remove the filter 30 form the photographing optical path. In this state, the biasing spring 39 biases the holding member 31. Even if the user releases his finger from the operation lever 33, the filter 30 is kept removed from the photographing optical path.

In order to insert the soft focus filter 30 in the optical path, the user moves the operation lever 33 in the opposite direction to cause the lever 33 to return to the illustrated position. The locking force of the lock lever is larger than the biasing force of the biasing spring 39.

In the telephoto photographing mode with a long focal point, the soft focus filter can be inserted in the photographing optical path or can be removed therefrom. In this manner, the soft focus filter can be appropriately used to take pictures When the telephoto photographing mode in FIG. 1 is switched to the wide-angle photographing mode, the main lens 10 and the members 30 to 37 are moved by a known mechanism (not shown) toward the cam lever 38 along the direction of the optical axis. In addition, the sublens 20 is removed from the photographing optical path. Meanwhile, the follower pin 37 abuts against the inclined surface of the cam lever 38, and the lock lever 35 is pivoted and disengaged from the notch 34. The released holding member 31 of the filter is pivoted by the biasing force of the biasing spring 40. The filter can be removed from the photographing optical path. In this case, the sublens 20 is also removed from the photographing optical path. The disposition of the optical system is given as indicated by the alternate long and two short dashed line in FIG. 2.

In the wide-angle photographing mode, the soft focus filter is rarely used. Even if the wide-angle photographing mode is set after the soft focus filter is used in the telephoto photographing mode, the filter can be automatically removed from the photographing optical path. As a result, no photographing errors occur.

In the wide-angle photographing mode, the lock lever 35 is held by the cam lever in a position where it cannot be engaged with the notch 34. Therefore, if the user wishes to use the soft focus filter in the wide-angle photographing mode, he must move the operation lever 33 to the illustrated position. He must take a picture while holding the operation lever with his finger.

In the wide-angle photographing state, the user releases the operation lever 33 and then the filter is removed from the photographing optical path.

In the wide-angle photographing state, photographing using the soft focus filter is a special photographing mode. Unless the user intends to use the soft focus filter, the soft focus filter cannot be held in the photographing optical path.

In the above embodiment, the lockable and nonlockable states are switched over by the locking mechanism utilizing the switching operation of the lens assembly. It is essential for the locking mechanism to change its locking state upon detection of the switching operation of the lens assembly. Therefore, the locking mechanism may be an electric locking mechanism.

In the above embodiment, a biasing spring is used to remove the soft focus filter from the photographing optical path. However, an electrical means may be used to remove the soft focus filter from the photographing optical path.

The present invention is also applicable to a camera having a variable focal length lens such as a zoom lens in addition to a camera whose focal lengths are stepwisely changed.

With the arrangement of the first embodiment, the following problem is presented. When the camera is set in the telephoto photographing mode and the soft focus filter is manually inserted in the photographing optical path of the photographing optical system, the soft focus filter is kept inserted unless the user manually removes the filter from the optical path or he sets the wide-angle photographing mode. Although an object is supposed to be photographed without the filter, the object tends to be undesirably photographed with the filter.

This problem also occurs in other auxiliary optical systems such as a close-up lens which provides a special photographing effect upon insertion of the lens in the photographing optical path.

A second embodiment will solve the above problem. An insertion/retraction mechanism is arranged to remove an auxiliary optical system such as a soft focus filter from the photographing optical system in synchronism with movement of a main lens along the optical axis. Whenever the photographing cycle is completed, the auxiliary optical system is automatically removed from the photographing optical path.

Figure 3:
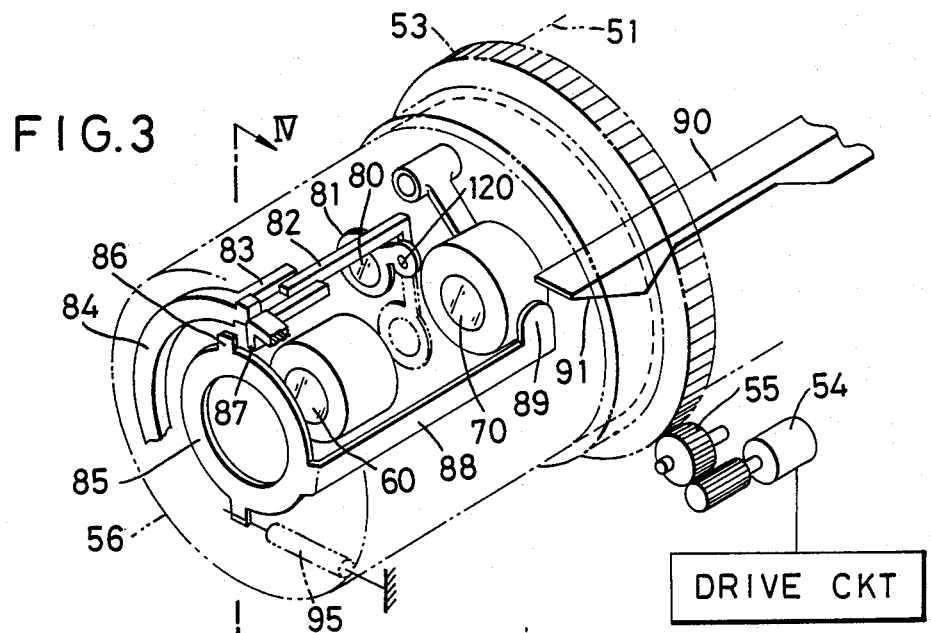
FIG. 3 is a schematic perspective view showing the overall arrangement of the lens assembly.
Figure 4:
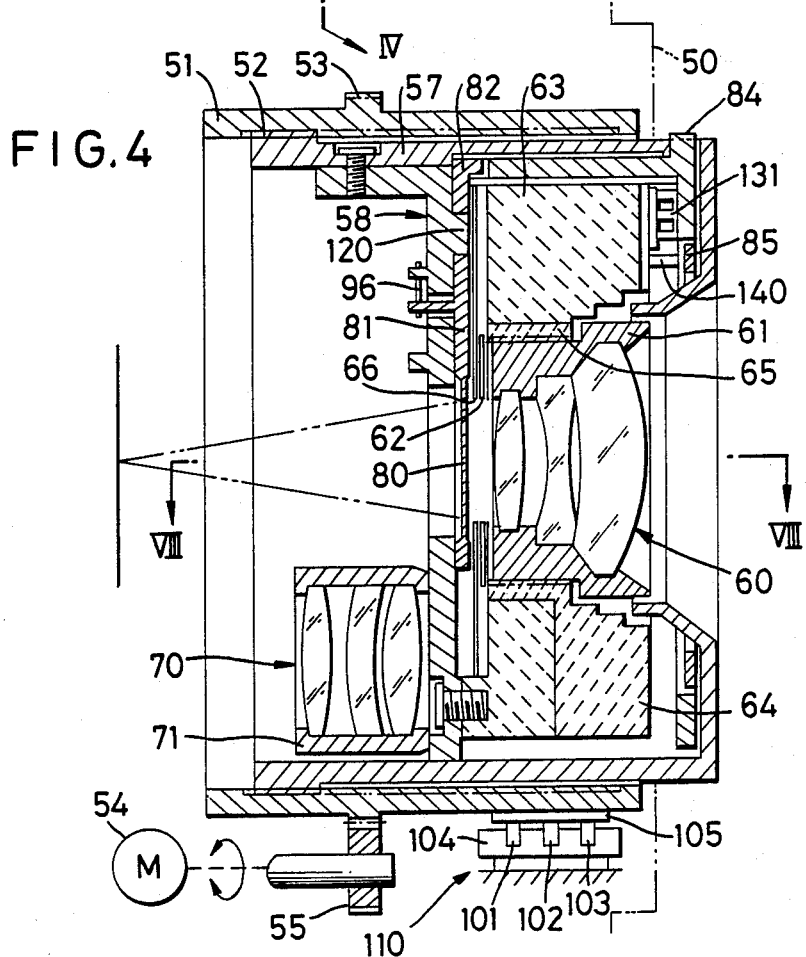
FIG. 4 is a sectional view of the lens assembly shown in FIG. 3 taken along the line IV—IV thereof.

FIG. 3 is a perspective view of the main part of the second embodiment, showing a state wherein the lens housing is held in the telephoto photographing position FIG. 4 is a sectional view of the lens housing in FIG. 3 taken along the line IV—IV thereof, showing a state wherein the lens housing is held in the wide-angle photographing position.

A guide cylinder 51 is rotatably supported by a camera body 50. A helicoid thread 52 is formed in the inner surface of the guide cylinder 51 from the proximal end to the distal end thereof. A gear 53 is formed on the outer surface. A drive gear 55 is meshed with the gear 53. The drive gear 55 is driven by a motor 54 arranged in the camera body 50.

A lens assembly housing 56 axially reciprocated with respect to the guide cylinder 51 includes an outer cylinder 57. A helicoid meshed with the helicoid thread 52 is formed on the outer surface of the outer cylinder 57. A support plate 58 is fixed inside the outer cylinder 57. Main lenses 60 are supported by a holding cylinder 61 on the object side (right side in FIG. 4) of the support plate 58 to be movable along the optical axis. A shutter control device 63 for driving an aperture/shutter 62 and a moving mechanism 64 for moving the main lenses 60 are mounted and fixed to the object side of the support plate 58. The holding cylinder 61 is meshed with a cylindrical portion 65 of the moving mechanism 64 through the helicoid thread and is moved along the optical axis upon rotation of the cylindrical portion 65.

Sublenses 70 supported by a holding frame 71 are arranged at the image side of the support plate 58 and can be inserted into or removed from the optical path of the main lenses 60.

When the sublenses 70 are set in the telephoto photographing position, they are inserted in the optical path of the main lenses. However, in the wide-angle photographing position, the sublenses 70 are removed from the optical path. A soft focus filter 80 is arranged between the shutter 62 and the support plate 58. The soft focus filter 80 is supported by a holding frame 81. The holding frame 81 is pivotal about a shaft 120 extending from the support plate 58 between an insertion position (indicated by the alternate long and two short dashed line in FIG. 3) where the sublenses are inserted in the optical path and a removal position (indicated by the solid line in FIG. 3) where the sublenses are removed from the optical path.

An arm 82 extending toward the object is formed on the holding frame 81. The arm 82 is fitted in a groove in a fork 83 extending backward from a filter operation ring 84. Referring to FIG. 3, the length of the arm 82 is exaggerated. The operation ring 84 is fitted on the outer cylinder 57 and is rotatable about the optical axis. The operation ring 84 has an operation knob extending on the outer surface of the outer cylinder 57. When the operation knob is rotated counterclockwise in FIG. 3, the soft focus filter 80 is inserted into the optical path. However, when the operation knob is rotated clockwise, the soft focus filter 80 is removed from the optical path.

A release ring 85 is rotatably coaxially mounted in the operation ring 84. A projection 86 of the release ring 85 opposes to be engaged with a projection 87 of the operation ring 84. The release ring 85 has an arm 88 extending from the peripheral portion to the rear portion of the camera. A cam follower 89 is formed at the distal end of the arm 88. The cam follower 89 is arranged to oppose a cam surface 91 of a cam plate 90 extending from the camera body 50 to the object upon movement of the lens housing 56 along the optical axis.

Figure 5:
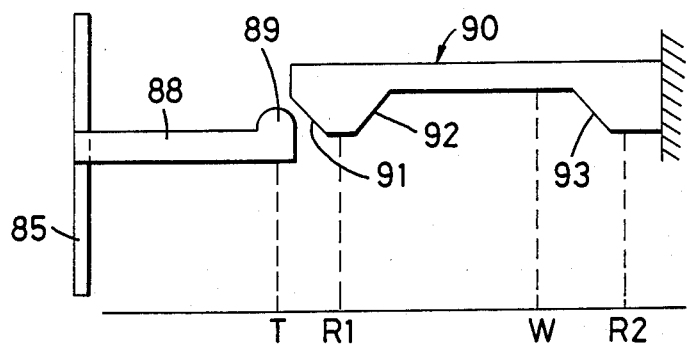
FIG. 5 is a side view showing a cam follower and a cam surface.

FIG. 5 shows a positional relationship between the cam plate 90 and the arm 88 of the release ring 85. In this state, the lens housing 56 is set in a telephoto photographing position T. In this case, the cam follower 89 is separated from the cam plate 90. The release ring 85 is stopped at a position where it is biased by a spring 95. When the lens housing 56 is retracted toward the camera and the cam follower 89 reaches a release position R1, the cam follower 89 is slid along the cam surface 91 and the release ring 85 is pivoted clockwise against the biasing force of the spring 95. The projection 86 urges the projection 87 of the operation ring clockwise, and thus the soft focus filter 80 is pivoted clockwise. A toggle spring 96 is mounted on the soft focus filter 80, as shown in FIG. 4. When the soft focus filter 80 adapted to be pivoted from the insertion position to the removal position passes the neutral position, the soft focus filter 80 is forcibly moved by the toggle spring 96 to the removal position. In the case wherein the soft focus filter 80 is moved from the removal position to the insertion position, when the filter 80 passes the neutral position, the filter 80 is forcibly moved to the insertion position by the toggle spring 96.

When the cam follower 89 passes by the release position R1, the cam follower 89 is slid along a cam surface 92 by the spring force of the spring 95, thereby pivoting the release ring 85 counterclockwise. The projection 86 of the release ring is separated from the projection 87 of the operation ring, thereby forming a gap between the projections 86 and 87, which is large enough to allow the user to manually move the operation ring 84 to insert the filter 80 in the optical path. Even if the housing 56 is set in a wide-angle photographing position W, this state is maintained.

When the filter 80 is inserted in the optical path in the wide-angle photographing position W and the lens housing 56 is then retracted to a reset position R2, the cam follower 89 is slid along a cam surface 93 to remove the filter 80 from the optical path, as described above.

As shown in FIG. 4, a support plate 104 for supporting terminals 101, 102, and 103 is fixed on the camera body so as to oppose the outer wall surface of the guide cylinder 51. A circuit board 105 is fixed on the wall surface of the distal end portion of the guide cylinder 51 and can be brought into slidable contact with the terminals 101, 102, and 103. These components constitute an encoder 110 for detecting the position of the lens housing. The circuit board 105 comprises a flexible printed board and generates an output representing the reset position R2, an output representing the wide-angle photographing position, and an output representing the telephoto photographing position T from the terminals 101, 102, and 103 contacting the flexible printed board according to the position of the housing 56.

Figure 6:
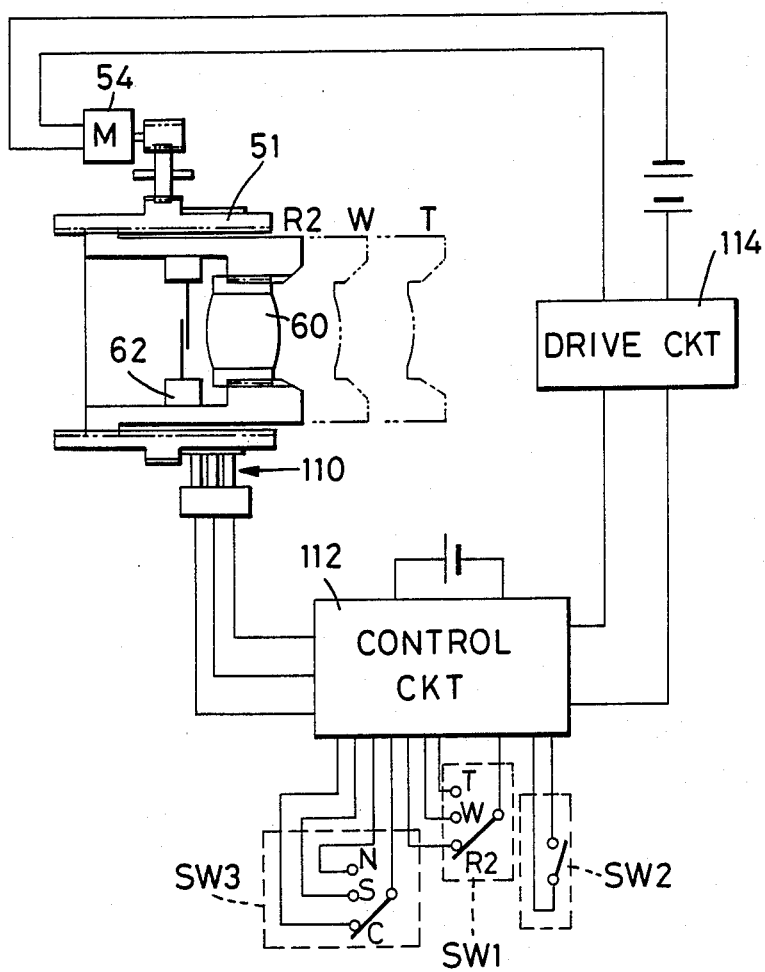
FIG. 6 is a block diagram of a control system in the lens assembly.

FIG. 6 shows a control system of this embodiment. A control circuit 112 comprises a known microcomputer including a ROM, a RAM, and a CPU. A switch SW1 sets the lens housing 56 in the reset position R2, the wide-angle photographing position W, and the telephoto photographing position T. A detection switch SW2 is closed to generate a filter signal when the soft focus filter is inserted in the optical path. A mode selection switch SW3 selects a continuous mode C for continuously using the soft focus filter, a single mode S for removing the soft focus filter for every photographing cycle, or a mode N in which the soft focus filter is not used. Outputs from the switches SW1 to SW3 together with an output from the encoder 110 are input to the control circuit 112. The control circuit 112 executes a program (to be described later) on the basis of these input signals and supplies a command signal to a drive circuit 114. The drive circuit 114 drives the motor 54 in response to the command signal.

Figure 7:
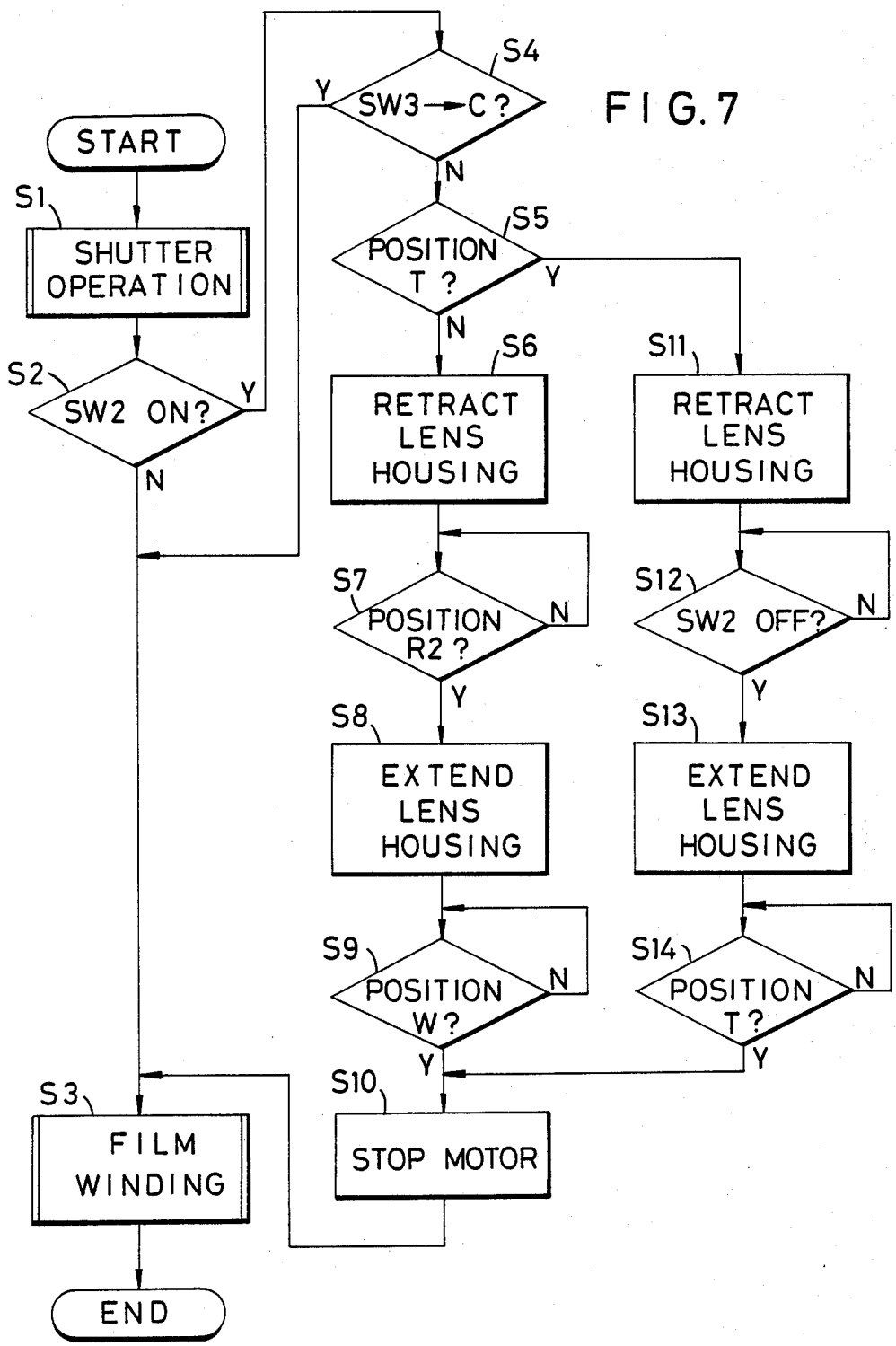
FIG. 7 is a flow chart for explaining processing procedures of the control system shown in FIG. 6.

The above embodiment will be described in more detail with reference to a flow chart of FIG. 7.

In step S1, operation control of the shutter 62 is executed. When exposure operation is completed, the flow advances to step S2. If the detection switch SW2 is open, the soft focus filter is removed from the optical path. In this case, the flow advances to step S3. In this step, film winding control is performed, and the photographing cycle is completed.

However, if the control circuit detects that the soft focus filter is inserted in the optical path, the detection switch SW2 is closed. In this case, the flow advances to step S4. The control circuit determines in this step whether the soft focus filter is continuously used on the basis of the signal output from the mode selection switch SW3. If the mode selection switch SW3 is set in the C terminal, film is wound in step S3, and thus the photographing cycle is completed.

However, if the mode selection switch SW3 is set in the S or N terminal, the flow advances to step S5. In this step, the control circuit determines whether the lens housing 56 is set in the telephoto photographing position T in accordance with the output from the encoder 110. If NO in step S5, i.e., the housing 56 is determined to be located at the wide-angle photographing position W, the control circuit supplies a command signal to the drive circuit so as to retract the lens housing in step S6. The drive circuit 114 drives the motor 54 in accordance with this command signal. Upon rotation of the motor 54, the guide cylinder 51 is rotated. The lens housing is retracted along the optical axis through the helicoid engagement. The control circuit determines in step S7 whether the lens housing has reached the reset position in accordance with the signal from the encoder 110. When the lens housing located at the wide-angle photographing position W is retracted to the reset position R2, the cam follower 89 is slid along the cam surface 93 of the cam plate 90 to rotate the release ring 85 clockwise, thereby removing the soft focus filter from the optical path, as described with reference to FIG. 5.

If YES in step S7, the flow advances to step S8. The control circuit supplies a command signal to the drive circuit 114. The drive circuit 114 drives the motor 54 so as to extend the lens housing. If the control circuit determines in step S9 whether the lens housing has reached the wide-angle photographing position W, the motor 3 is stopped in step S10.

If the lens housing is located at the telephoto photographing position T, the control circuit determines step S5 to be YES. In this case, the flow advances to step S11. The lens housing is retracted in the same manner as in step S6. When the cam follower 89 is slid along the cam surface 91 and the soft focus filter is removed from the optical path, the filter signal from the detection switch SW2 is disabled. The control circuit determines step S12 to be YES. The flow advances to steps S13 and S14. In steps S13 and S14, the lens housing is reset to the telephoto photographing position T.

Determination in step S12 may be performed such that the encoder generates a signal corresponding to the disabled filter signal at a lens housing position corresponding to the removal position If the lens housing 56 is set in the telephoto photographing position T, the output from the switch SW2 and the filter signal from the encoder need not be used. Removal of the soft focus filter may be detected by detecting retraction of the lens housing 56 to the reset position R2 or the wide-angle photographing position W.

Alternatively, the soft focus filter may be removed from the optical path by extending the lens housing from the wide-angle photographing position to cause the cam follower to slide along the cam surface 92 shown in FIG. 5, instead of removing of the soft focus filter in synchronism with retraction of the lens housing 56.

Auxiliary optical systems excluding the soft focus filter include optical elements for changing optical photographing effects, such as a polarizing filter and a close-up lens.

In the second embodiment, the support plate 58 is disposed to be movable along the optical axis and supports the main lenses 60 and the shutter 62 on the front side thereof (on the object side) and sublenses on the rear side thereof (on the image plane side). The optical element 80 having a function different from the sublenses is arranged in a narrow space between the shutter 62 and the support plate 58. Thrust (axial) movement of the optical element 80 is limited between the front end of the support plate 58 and a partition plate for limiting thrust movement of the shutter 62. The optical element 80 can be stably held between the insertion position on the photographing optical axis and the removal position outside the photographing optical path. The holding frame 81 for holding the optical element 80 is slid on the front surface of the support plate 58, thereby preventing thrust movement and allowing smooth movement of the holding frame 81. Insertion/removal of the optical element can be performed by the operation ring 84 independently of movement of the support plate 58 along the optical axis. The optical element can be inserted in the optical path in the wide-angle photographing state, the telephoto photographing state, or during switching of the focal length. The sublenses are arranged on the lower surface of the support plate 58. Variations in movement of the sublenses along the thrust direction can be restricted by the lower surface of the support plate. The sublenses can be stably held between the insertion and removal positions. Moreover, the sublenses can be automatically removed upon movement of the support plate along the optical axis.

The above features of the second embodiment will be described in detail with reference to FIGS. 8 to 14.

Figure 11:
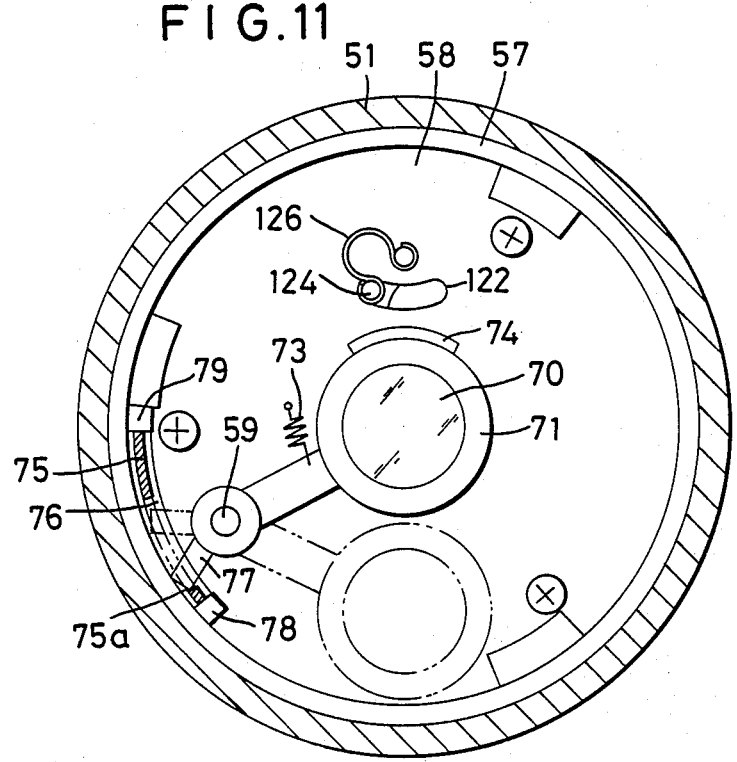
FIG. 11 is a sectional view of the lens assembly shown in FIG. 9 taken along the line XI—XI thereof.

As shown in FIG. 11, the holding frame 71 of the sublenses 70 has an arm 72 and is supported to be rotatable about a pin 59 extending on the support plate 58. The optical axis of the sublenses 70 is aligned with that of the main lenses at a position where the holding frame 71 abuts against a projection 74 by a tension coil spring 73.

Figure 8:
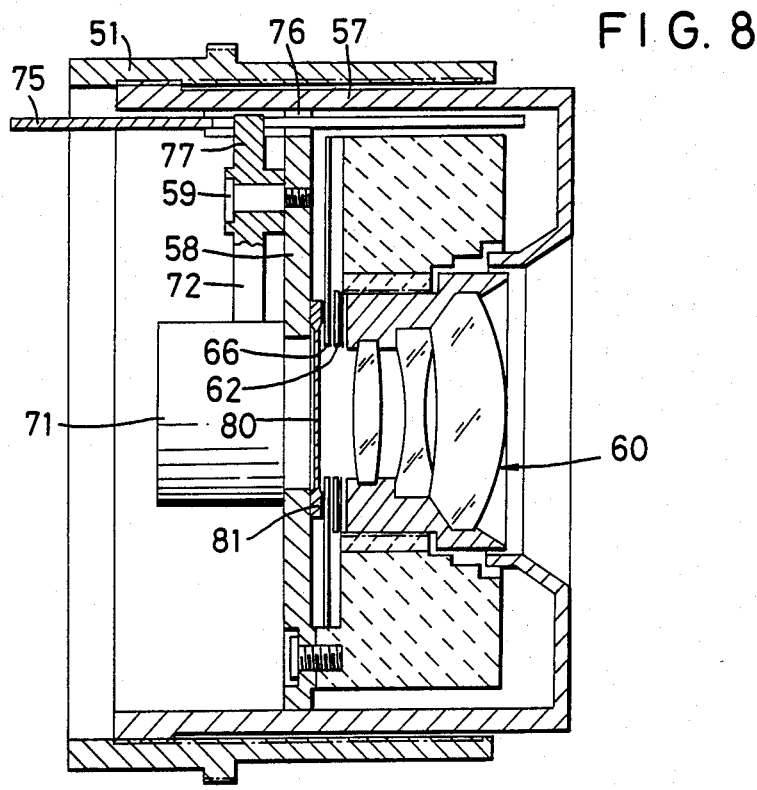
FIG. 8 is a sectional view of the lens assembly shown in FIG. 4 taken along the line VIII—VIII thereof.

Referring to FIG. 8, an axially extending guide plate 75 fixed on the camera body extends through a groove 76 formed in the support plate 58 in the right direction. The guide plate 75 has a fork-like shape, as shown in FIG. 10. A cam surface 75a engaged with an arm 77 formed on the holding frame 71 is formed on one projection of the fork. The both side surfaces of the guide plate 75 are slidably fitted in two guide projections 78 and 79 formed in the support plate 58. When the guide cylinder 51 is rotated, the support plate 58 together with the outer cylinder 57 are moved straight in a direction of the optical axis. When the support plate 58 is retracted from the telephoto position to the left in FIG. 9, the arm 77 is moved on the cam surface 75a in the left direction and at the same time is rotated clockwise in FIG. 11. Therefore, the holding frame 71 can be moved to the removal position as indicated by the alternate along and short dashed line.

The frame 81 of the filter 80 is disposed in a relatively narrow space formed between the support plate 58 and the shutter 62 formed on the upper surface of the support plate 58. As described with reference to FIG. 3, the filter 81 is rotatable about the shaft 120, and the deviation in the thrust direction can be limited by the upper surface of the support plate 58 and the lower surface of the partition plate 66 of the shutter 62.

Figure 12:
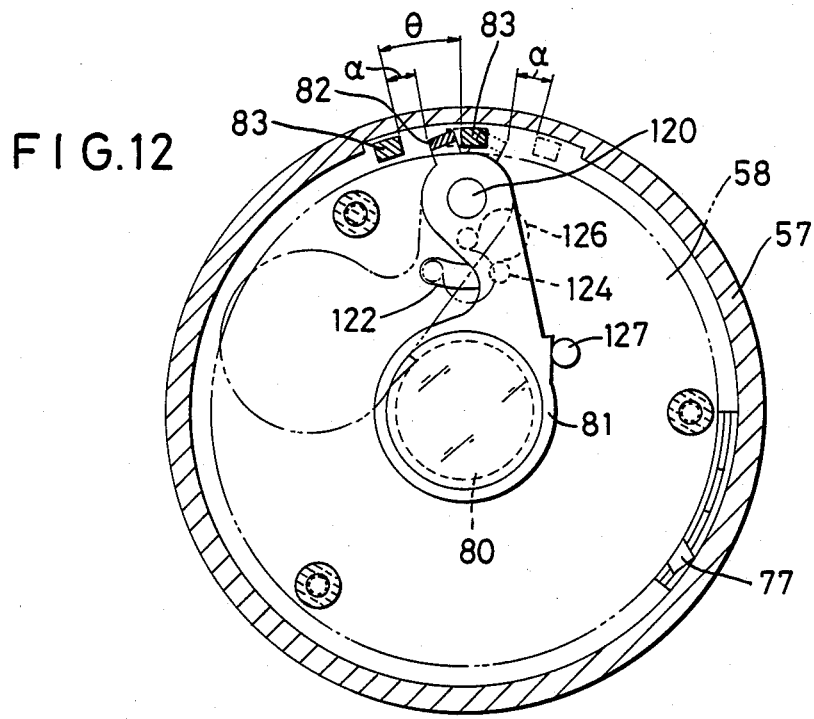
FIG. 12 is a sectional view of the lens assembly shown in FIG. 9 taken along the line XII—XII thereof.

The relationship between the filter frame 81 and the fork 83 of the operation ring 84 is illustrated in FIG. 12. Upon turning of the operation ring 84, one of the projections of the fork 83 abuts against the arm 82 of the filter frame 81 and urges thereagainst. The filter frame 81 is rotated about the shaft 120. A movable pin 124 is formed on the filter frame 81 and extends through an arcuated split groove 81 formed in the support plate 58. A toggle spring 126 is hooked between the movable pin 124 and a stationary pin extending on the lower surface of the support plate 58. When the operation ring 84 is set in the set position, the toggle spring 126 biases the filter frame 81 counterclockwise, as shown in FIG. 12. However, when the operation ring 84 is set in the reset position, the toggle spring 126 biases the filter frame 81 clockwise. As shown in FIG. 12, when the filter frame 81 abuts against a limiting pin 127, the filter 80 is inserted and fixed on the photographing optical axis. A distance θ between the pair of projections of the fork 83 is sufficiently large in association with a safety switch device (to be described below).

Figure 13:
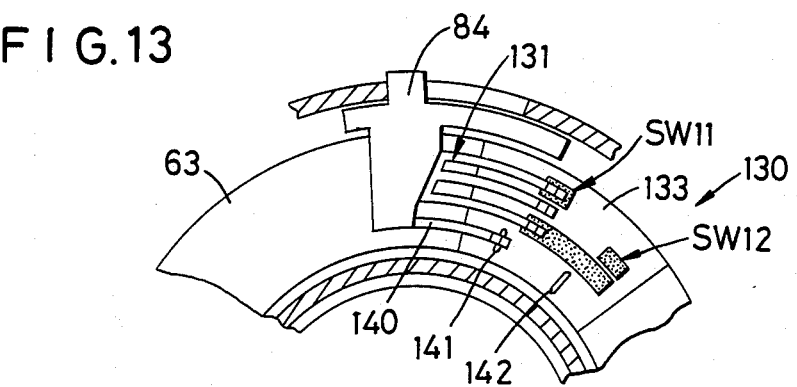
FIG. 13 is a plan view of a control switch.

A safety switch device 130, a sliding brush unit 131, and a click spring 140 are arranged at the position (FIG. 4) of the operation ring so as to inhibit the shutter release operation during movement of the filter frame 81. The sliding brush unit 131 comprises three contact brushes, as shown in FIG. 13, and combinations of the contact brushes and conductor lands formed on an insulating substrate 133 formed on the shutter control device 63 constitute two switches SW11 and SW12. The switch SW11 is closed when the operation ring 84 is held in the state shown in FIG. 13. The switch SW12 is closed when the operation ring 84 is moved to the right end.

The click spring 140 mounted on the distal end of a flat portion 23D is coupled with a click groove 141 or 142 so as to keep the switch SW11 or SW12 in the closed state.

Figure 14:
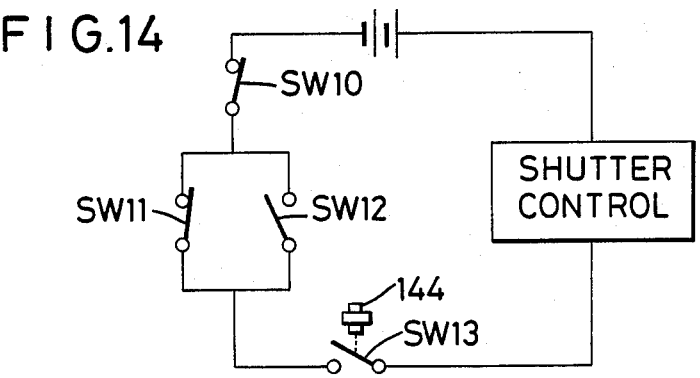
FIG. 14 is a wiring diagram of the control switch shown in FIG. 13.

The switches SW11 and SW12 are connected in parallel to a power source, as shown in FIG. 14. These switches are connected to the shutter control device through a release switch SW13 interlocked with a release button 144.

A distance to the object to be photographed is measured by an automatic distance measuring device (not shown). The cylindrical portion 65 of the moving device 64 is controlled in accordance with the detection signal. Upon rotation of the cylindrical portion 65, the main lenses 60 are extended along the optical axis, and automatic focus control is performed.

In order to change the wide-angle photographing mode to the telephoto photographing mode, the switch SW1 in FIG. 6 is connected to the terminal T. Upon rotation of the motor 54, the outer cylinder 57 and the support plate 58 are moved together from the position of FIG. 4 to the right position.

In synchronism with movement of the support plate 58, the arm 77 of the holding frame 71 is moved toward the cam surface 75a of the guide plate 75. The holding frame 71 is turned from the position of the alternate long and two short dashed line to a position corresponding to the state in FIG. 11. In this case, the holding frame 71 is in contact with the lower surface of the support plate 58 and is strongly urged and supported against the arcuated projection 74 by the biasing force of the tension coil spring 73. Therefore, the holding frame 71 is maintained in position In order to move the sublenses 70 from the telephoto photographing state shown in FIG. 9 to the wide-angle photographing state, the switch SW1 is set in the position of the terminal W to rotate the motor 54 in the reverse direction to move the outer cylinder 57 and the support plate 58 together in the left direction. In either the wide-angle or telephoto photographing mode, the main lenses 60 are immediately moved to the reset position obtained by slightly retracting the lens housing from the infinite in-focus position as soon as the shutter 62 is operated to take a picture, thereby preparing for the next photographing cycle.

The operations of the filter 80 and the switch device 130 will be described below.

Figure 9:
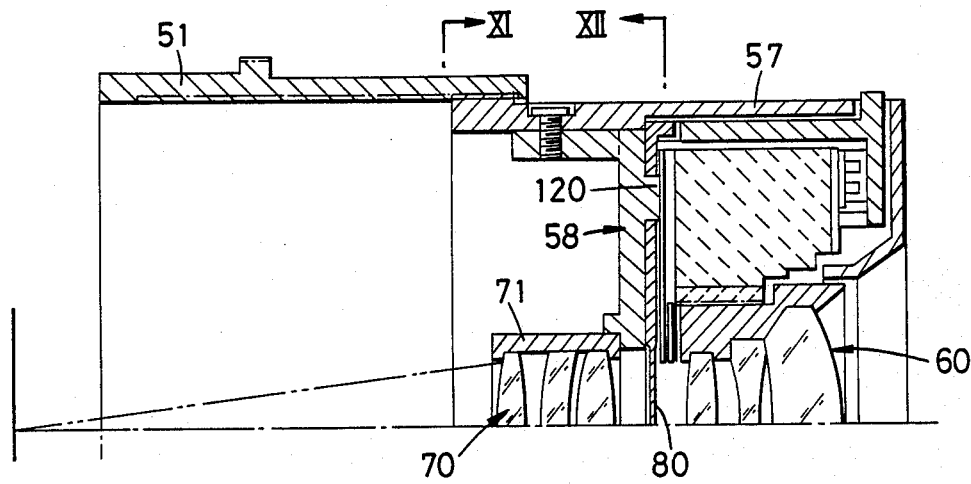
FIG. 9 is a partial sectional view of the lens assembly in the telephoto mode.
Figure 10:
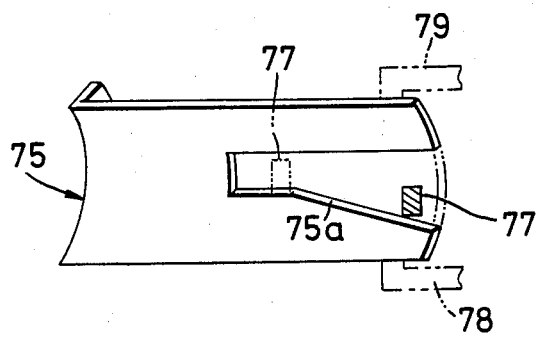
FIG. 10 is a perspective view of a guide plate.

When the filter 80 is inserted in the photographing optical axis, as shown in FIGS. 4 and 9, the operation ring 84 is located at the left end, i.e., the window of the outer cylinder 57, as shown in FIG. 13. The click spring 140 is fitted in the click groove 141. In this state, the filter frame 81 is biased by the toggle spring 126 and abuts against the limiting pin 127.

In this state, as shown in FIG. 13, the switch SW11 in the control switch device 130 is kept on. Therefore, when a power switch SW10 and the release switch SW13 are sequentially turned on, power is supplied to the shutter control device to operate the shutter 62.

When the operation lever 84 is moved to the right end of the window of the outer cylinder, the removal process of the filter 80 is executed. As shown in FIG. 12, there is a play α between the arm 82 of the holding frame 81 and one of the projections of the fork 83 of the operation ring 84. While the operation ring 84 is displaced by a distance corresponding to the play α, the switch SW1 is opened. Therefore, even if the release switch SW13 is turned on, the shutter control device is kept inoperative When the operation ring 84 is further displaced and one of the projections of the fork 83 urges the arm 82, the filter 80 starts removal from the photographing optical axis.

When the operation ring 84 is moved to substantially the neutral position, the biasing direction of the toggle spring 126 is inverted. Therefore, the filter 80 is rapidly rotated clockwise and is moved to the removal position and stopped thereat. In this case, the relationship between the play $\alpha$ and the displacement of the arm 82 is determined so that the arm 82 does not abut against the other projection of the fork 83, thereby achieving smooth switching.

While the operation ring 84 is moved from the neutral position by the play o, the switch SW12 is turned on. Upon operation of the release switch SW13, the shutter control device is operated. It should be noted that the operation ring 84 is positioned when the distal end of the click spring 140 is fitted in the click groove 142.

In order to insert the filter 80 from the removal position to that on the photographing optical axis, the operation ring 84 is moved in a direction opposite to that described above.

In the above embodiment, the switches SW11 and SW12 are used as safety switches for inhibiting the release operation. However, signals from these switches can be used to control a correction circuit for correcting a change in exposure value caused by insertion of the filter and a circuit for correcting a change in optical path length. These will be described later herein.

In the safety switch device 130 in the above embodiment, when the filter 80 is located in the insertion and removal positions, one of the switches SW11 and SW12 is turned on to render the shutter operative. During displacement of the filter, the switches SW11 and SW12 are turned off to inhibit operation of the shutter. In addition, the filter frame 81 is held between the support plate 58 and the shutter partition plate 66. Movement of the filter frame 81 in the thrust direction is limited by the surfaces of the support plate 58 and the partition plate 66. Therefore, the filter frame 81 can be stably located in the insertion and removal positions. Moreover, the filter frame 81 can be moved within a plane perpendicular to the photographing optical axis during its movement and is not subjected to vibrations. Therefore, operation of the filter frame 81 is very stable.

In the above embodiment, the main lenses 60 are moved with respect to the support plate 58 to perform focusing control However, the main lenses may be fixed on the support plate 58 and the support plate 58 may be moded to achieve focusing control in the wide-angle photographing mode, switching of the focal lengths, and focusing control in the telephoto photographing mode.

Figure 15:
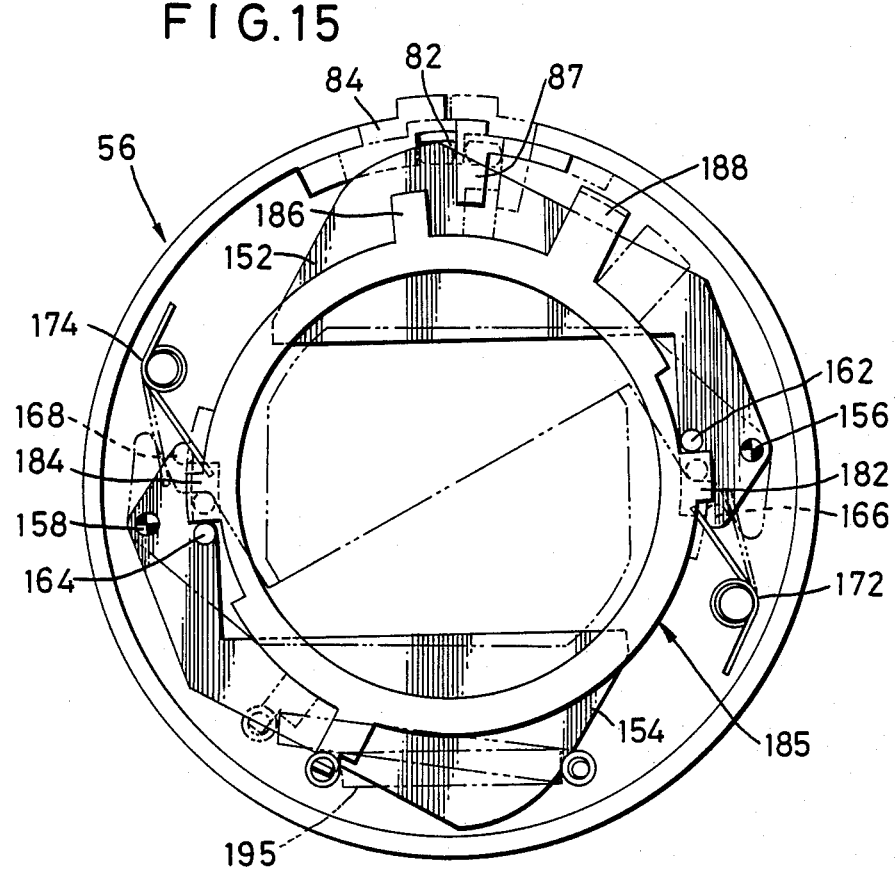
FIG. 15 is a front view showing a main part of a lens assembly according to a second embodiment of the present invention.

In the embodiment shown in FIG. 15, a drive ring may be arranged in place of the release ring 85 shown in FIG. 3 to drive a cover for protecting the front surface of the lens. When the main switch of the camera is turned off upon completion of photographing, the filter is removed from the optical path in synchronism with the drive ring for closing the protective cover.

The cover for protecting the front surfaces of the main lenses is constituted by a pair of plate members 152 and 154. The pair of plate members 152 and 154 are symmetrical blades for shielding the optical path, as indicated by the alternate long and two short dashed line, when they are matched with each other The plate members 152 and 154 are pivotally supported by pins 156 and 158 at the front portion of the lens housing 56.

Engaging bosses 162 and 164 and pins 166 and 168 extend from the proximal portions of the plate members 152 and 154, respectively.

Biasing springs 172 and 174 are engaged with the pins 166 and 168 to close the plate members 152 and 154, respectively.

A drive ring 185 is used in place of the release ring 85 shown in FIG. 3. The drive ring 185 comprises an arm 188 coupled to a cam surface 91 of a cam plate 90. The drive ring is biased counterclockwise by a spring 195. Projections 182 and 184 are formed on the circumferential surface of the drive ring 185 and oppose the engaging bosses 162 and 164, respectively. When the drive ring 185 is rotated to engage the projections 182 and 184 with the engaging bosses 162 and 164, the plate members 152 and 154 are rotated clockwise to open the protective cover.

A projection 186 formed on the upper surface of the drive ring 185 is engaged with the projection 87 of the operation ring 84 shown in FIG. 3.

The operation of this embodiment will be described below.

When the camera is set in the photographing state, as shown in FIG. 3, a main switch (not shown) is turned on and the main lenses 60 are extended. In this case, the protective covers 152 and 154 are open, as shown in FIG. 15. In other words, the arm 188 of the drive ring 185 is separated from the cam surface 91 of the cam plate 90. The ring 185 is pivoted by the biasing force of the biasing ring 195. The projections 182 and 184 urge the engaging bosses 162 and 164 of the plate members 152 and 154. The plate members 152 and 154 are rotated about the pins 156 and 158 against the biasing forces of the biasing springs 172 and 174, respectively. Therefore, the plate members 152 and 154 are separated from each other.

Insertion or removal of the filter 80 is performed by manually operating the operation ring 84, as needed.

When the photographing cycle is completed and the main switch is turned off, the switch SW1 of FIG. 6 is set in the position R2. As described above, the outer cylinder 57 is retracted to urge the arm 88 against the cam surface 91. The drive ring 185 is pivoted clockwise.

When the drive ring 185 is pivoted clockwise, the plate members 152 and 154 are pivoted and matched with each other in front of the main lenses 60, thereby shielding and protecting the lenses 60.

Upon pivotal movement of the drive ring 185, the projection 186 causes the operation ring 84 to displace in the right direction through the projection 87. As a result, the filter 80 which is located within the photographing optical path is removed therefrom and is held in the removal position The main lenses 60 are completely retracted, and the camera is rendered inoperative in the nonphotographing state.

When the main switch is turned on and the switch SW1 of FIG. 6 is set in the position T or W, the support plate 58 and the drive ring 185 are extended and the arm 188 is separated from the cam surface 91.

The drive ring 185 is pivoted counterclockwise to open the protective covers 152 and 154. Upon pivotal movement of the drive ring 185, the projection 186 is also moved. However, the operation ring 84 is kept stopped and held in the removal position. In other words, at the beginning of photographing, the filter 80 is always removed from the photographing optical path. This state is defined as an initial state, and photographing is initiated.

In each embodiment described above, when the optical element such as a soft focus filter is inserted in the photographing optical path, the effective optical path length is changed to adversely affect focusing precision. The subsequent embodiments exemplify cameras wherein optical elements can be used without impairing focusing precision.

Figure 16:
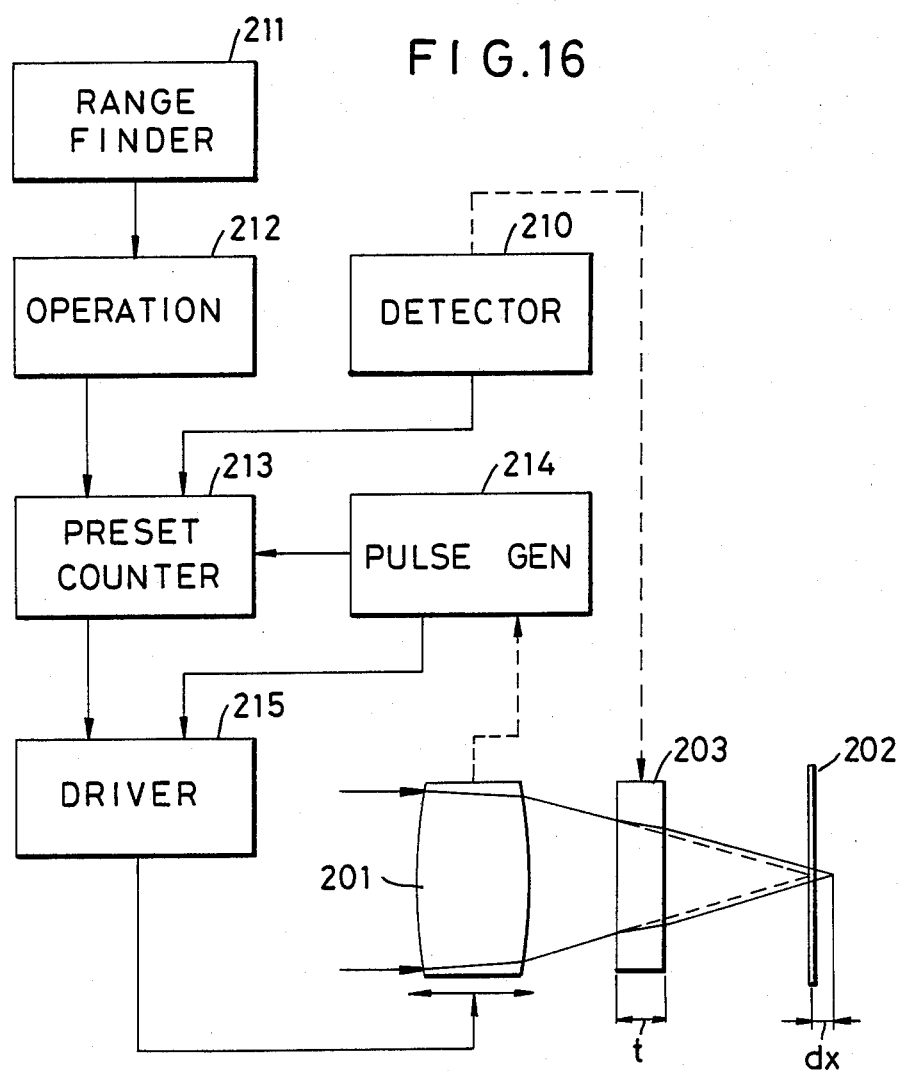
FIG. 16 is a block diagram of a third embodiment of the present invention.

FIG. 16 shows a camera focal length correcting apparatus having a means for detecting use of an optical element, and a control means for controlling an automatic in-focus position of a photographing optical system according to a change in optical path length caused by use of the optical element.

A soft focus filter 203 is arranged between a photographing optical system 201 and a film surface 202. The filter 203 can be arbitrarily removed from the optical path by the user. A detector 210 is arranged to detect that the filter 203 is inserted in the optical path.

An automatic focusing apparatus comprises a range finder 211, an operation unit 212, a preset counter 213, a pulse generator 214, and a driver 215. A measured distance value from the range finder 211 is converted into a control value by the operation unit 212. The pulse generator 214 includes an encoder for converting displacement of the photographing optical system 201 along the optical axis into a pulse train and generating a time-serial pulse output. The preset counter 213 generates a value for stopping the photographing optical system 201 on the basis of the value from the operation unit 212 and the pulse output from the pulse generator 214. The photographing optical system is driven along the optical axis by the driver 215 until the value from the preset counter coincides with the number of pulses generated by the pulse generator 214. The driver 215 comprises a known mechanism consisting of a means for axially displaying the photographing optical system 201 from the initial position (the infinite in-focus position), latching means for interrupting the displacement of the photographing optical system, and a means for generating an output signal for operating the latch means.

When the soft focus filter 203 is inserted in the photographing optical path of the photographing optical system 201, the light beam is changed from the state wherein the filter 203 is not inserted to a state indicated by the solid line. That is, the optical path length is increased.

An increase in optical path length is given as follows:

$$dx = t(1 - 1/n)$$

where t is the thickness of the filter 203 and n is the refractive index.

If $n = 1.49$, then $dx = 0.329t$.

When the filter 203 is inserted in the photographing optical path, the detector 203 detects insertion of the filter 203 and supplies to the preset counter 213 a correction value signal corresponding to the optical characteristics of the filter 203.

The correction value signal is defined as follows. If an extension amount per step of the photographing optical system 201 is given as 0.15 mm, the following relation is obtained according to the thickness t of the filter 203 and an increase dx in the optical length:

$$t = 0.15/0.329 = 0.456 \text{ mm}$$

The photographing optical system is displaced one step per 0.456 mm of the thickness of the filter 203.

The preset counter 213 changes the preset value on the basis of the correction value signal. The driver 215 causes the photographing optical system 201 to stop when the updated value coincides with the number of pulses generated by the pulse generator. Therefore, even if the soft focus filter is inserted, the photographing optical system can accurately focus an object image on the film surface.

A modification of the above embodiment is described below. In this modification, a correction value signal from the detector 210 may be input to the range finder 211 or the operation unit 212 to update its output value or it may be input to the driver 215 to offset the generation timing of the output signal.

In addition to the automatic focusing apparatus described above, various other automatic focusing apparatuses are known The in-focus position of any automatic focusing apparatus can be corrected in accordance with the features and principle thereof Other embodiments will be described wherein an optical element itself is arranged to have a positive power lens characteristic and a change in optical path length upon insertion of the optical element in the optical path can be prevented.

Figure 17:
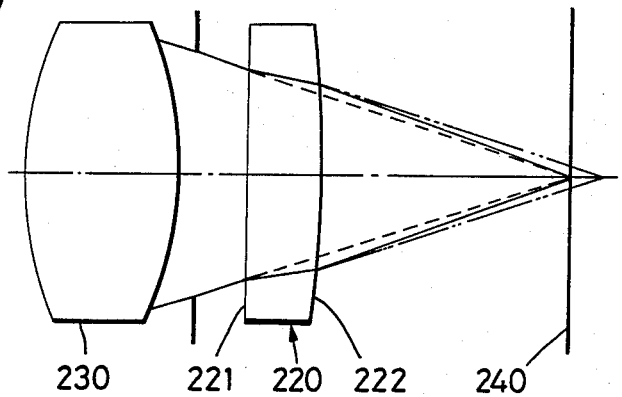
FIG. 17 is a view showing a photographing optical path in an optical system using a soft focus filter according to a fourth embodiment of the present invention.

Referring to FIG. 17, a soft focus filter 220 is defined by a flat surface 221 opposite to a photographing optical system and a convex surface 222 opposite to a focal plane 240 The flat surface serves as a micro-mat surface to provide a soft-tone image of the object upon insertion of the filter 220 in the photographing optical path.

If a thickness of the filter 220 between a front principal point H1 and a rear principal point H2 is given as Ht, a distance from the rear principal point H2 to the focal plane 240 is B, a distance from the front principal point H1 to the focal plane 240 is D, and focal length of the filter 220 is given as F, the following relations are derived:

$$B + Ht = D$$

$$1/-D + 1/B = 1/F$$

and the specifications of the filter 220 having the positive lens characteristics can be obtained from the above relations.

The light beam is corrected by the positive lens characteristics of the filter 220, and the position of the focal plane upon use of this filter coincides with the position of the focal plane upon removal of this filter, as indicated by the broken line. It should be noted that the optical path free from the lens characteristics of the filter 220 is indicated by the alternate long and two short dashed line.

Figure 18:
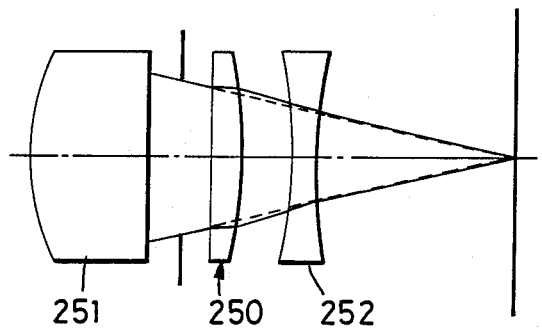
FIG. 18 is a view showing a photographing optical path in the optical system according to a first modification of the fourth embodiment.

FIG. 18 shows an arrangement wherein a soft focus filter is built into a camera having a focal length switching function. The aperture and a filter 250 are integrally moved upon displacement of main lenses 251 along the optical axis. A sublens system 252 is removed from the optical path in the wide-angle photographing mode. However, in the telephoto photographing mode, the sublens system 252 is inserted in the optical path. FIG. 18 shows a state wherein the camera is set in the telephoto photographing system.

In this arrangement, the main lenses 251, the aperture, and the filter 250 serve as an integral optical system. In either the telephoto or wide-angle photographing mode, the change in optical path length upon insertion or removal of the filter does not occur.

Figure 19:
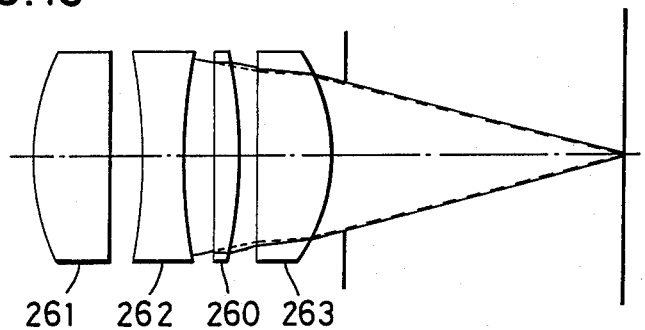
FIG. 19 is a view showing a photographing optical path in the optical system according to a second modification of the fourth embodiment.

FIG. 19 shows an embodiment wherein a filter is inserted in an optical system having a plurality of lenses which are moved together Lenses 261, 262, and 263 constitute a photographing optical system. A filter 260 is inserted between the lenses 262 and 263 or removed therefrom.

Figure 20:
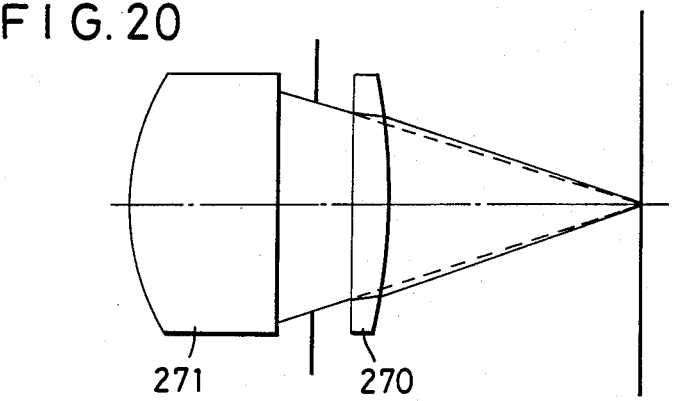
FIG. 20 is a view showing a photographing optical path of the optical system of a third modification in a wide-angle photographing mode.
Figure 21:
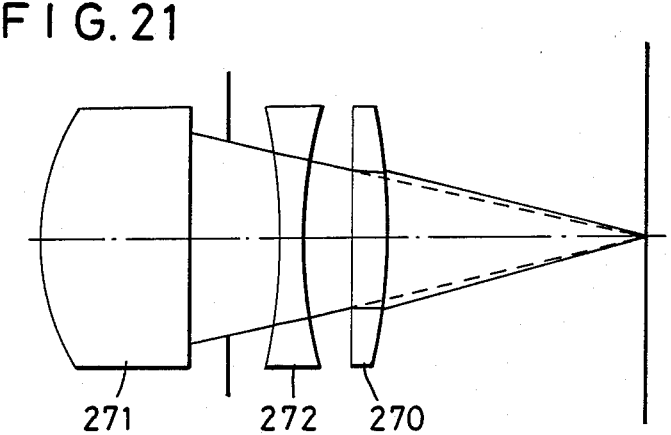
FIG. 21 is a view showing a photographing optical path of the optical system of the third modification in a telephoto photographing mode.

Still another embodiment will be described wherein the present invention is applied to a camera having a focal length switching function Main lenses 271, an aperture, a filter 270, and sublenses 272 are arranged along the optical axis. The aperture is moved upon movement of the main lenses 271 along the optical axis. However, the filter 270 is fixed in position. In the wide-angle photographing mode, the sublenses 272 are removed from the optical path. However, in the telephoto photographing mode, the sublenses 272 are inserted in the optical path. FIG. 20 shows a state in the wide-angle photographing mode, and FIG. 21 shows a state in the telephoto photographing mode.

Unlike in the arrangement of FIG. 18, the filter 270 comes nearest the focal plane.

The filter according to this embodiment can be effectively used to self-correct a change in optical path length upon insertion thereof.

For example, in a single-lens reflex camera, the user must control focusing while always observing the object to be photographed. The change in optical path length upon insertion of the filter does not appear to adversely affect photographing. However, an error is always included in a value indicated by the distance scale. If a signal obtained with the distance scale is utilized, it is very effective to use this filter.

In the filter of this embodiment, the incident surface may be a convex surface, and the focusing surface may be a flat surface, or both the incident and focusing surfaces may have given radii of curvature. Alternatively, a color material may be used to provide a filtering function to the filter.

According to one of the conventional camera automatic exposure schemes, automatic exposure control is performed according to a program wherein combinations of aperture values and exposure times are determined as a function of field luminances. This is called "program auto exposure (program AE)". In the program AE, if the field luminance is large, the aperture f-number is increased and hence the depth of field is increased. Particularly, in a compact camera, a photographing lens has a short focal length, and the depth of field tends to be further increased. In this manner, if the depth of field is increased, the background can be clearly photographed. It is, therefore, difficult to utilize contrast between the principal object and the background in an actual picture It is impossible to utilize an out-of-focus image of the background to emphasize only the principal object Soft-tone photographing using a soft focus filter or a soft focus lens is very effective when only the principal object is emphasized at a small depth of field.

The subsequent embodiment exemplifies a camera wherein an aperture f-number is automatically decreased according to selection of soft-tone photographing.

Figure 22:
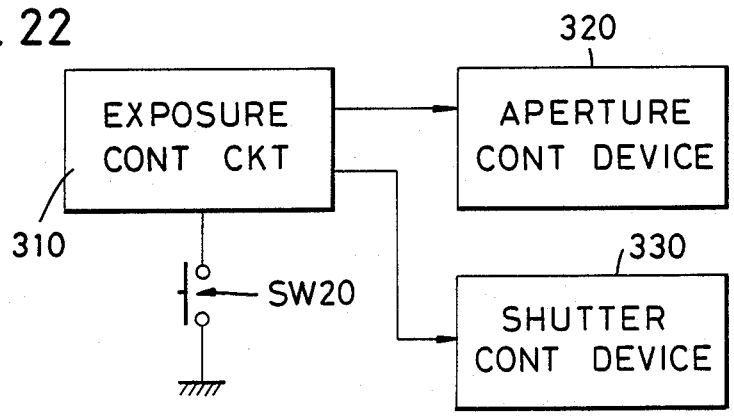
FIG. 22 is a block diagram of a fifth embodiment of the present invention.

FIG. 22 is a block diagram of a program AE apparatus in this embodiment.

The output terminal of an exposure control circuit 310 is connected to an aperture control device 320 including a magnet for driving the aperture and to a shutter control device 330 including a magnet for driving the shutter.

A switch SW20 is a photographing setting switch which is turned on in synchronism with insertion of the soft focus filter in the photographing optical system or attachment of the soft focus lens to the camera body in response to detection of the detector 210 in FIG. 16.

The exposure control circuit 310 calculates an optimal aperture value and the shutter time in accordance with light from the object. As described above, the exposure control circuit 310 starts its operation in response to the ON operation of the setting switch SW20.

The magnet in the aperture control device 320 controls the aperture of the photographing lens and is energized in response to a control signal from the exposure control circuit 310 to interrupt a displacement of the aperture.

The magnet in the shutter control device 320 controls driving of the shutter of the camera and is energized in response to the control signal from the exposure control circuit 310 to control the end timing of exposure of the shutter.

Figure 23:
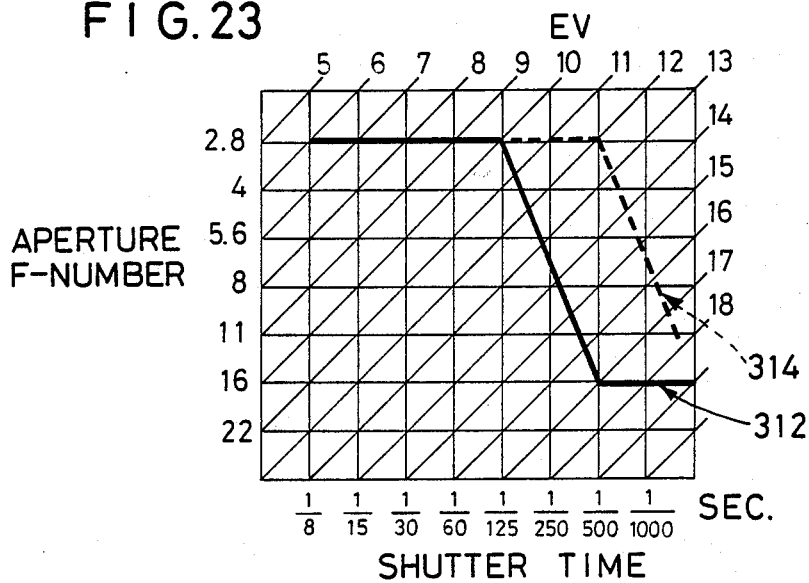
FIG. 23 is a table showing aperture f-number as a function of shutter time in a program.

FIG. 23 shows a program showing the relationship between the aperture f-number and the shutter time. A program line indicated by a solid polygonal line 312, which is set for normal photographing. If the exposure value reaches EV=10, the aperture f-number of F2.8 is maintained. However, if the exposure number exceeds EV=10, the aperture f-number is increased (the aperture size is decreased). At the same time, the shutter time is continuously shortened to obtain an optical exposure corresponding to the exposure value. For example, if the exposure value is EV=17, the aperture f-number and the shutter time are set to be F16 and 1/500 (sec), respectively.

A program line 314 indicated by the broken polygonal line is set in correspondence with soft-tone photographing. Until the exposure value reaches EV=12, the full-aperture f-number is kept to be F2.8. However, if the exposure value reaches EV=12, the aperture f-number and the shutter time are continuously changed. The aperture f-number is increased (the aperture opening is small) and the shutter time is continuously changed to obtain an optical exposure corresponding to the exposure value. For example, if the exposure value is EV=16, the aperture f-number and the shutter time are set to be F8 and 1/1000 (sec), respectively.

When the exposure value exceeds EV=10, the aperture f-number defined by the program line 314 is set to be smaller than that defined by the program line 312. In other words, the aperture diameter is kept to be large. The shutter time defined by the program line 314 is shorter than that defined by the program line 312. For example, if the exposure value is EV=16, the aperture f-number is set to be F11, and the shutter time is substantially set to be 1/500 (sec) according to the program line 312. However, according to the program line 314, the aperture f-number is set to be F8, and the shutter time is set to be 1/1000 (sec). Therefore, although the same exposure amount as in normal photographing is maintained, the aperture opening is increased and the shutter time is shortened.

A mechanism for changing the aperture f-number and the shutter time while the overall exposure amount is maintained unchanged is called a "program shift" mechanism. The program line 314 may be obtained by shifting the program line 312 of the program to a state wherein the aperture opening is increased.

In the program AE apparatus having the above arrangement, the program line 312 is set in the normal photographing state. If soft-tone photographing is selected, e.g., the soft focus filter is inserted in the photographing optical system and the soft focus lens is attached to the camera body, the setting switch SW20 is turned on. In response to the operation of the setting switch SW20, the exposure control circuit 310 is operated to shift the program from the program line 312 to the program line 314 for soft-tone photographing. The aperture control device 320 and the shutter control device 330 are operated in response to the control signal from the exposure control circuit 310. The aperture f-number is decreased, i.e., the aperture opening is increased, and at the same time the shutter time is shortened, as compared with the normal photographing mode.

Figure 24:
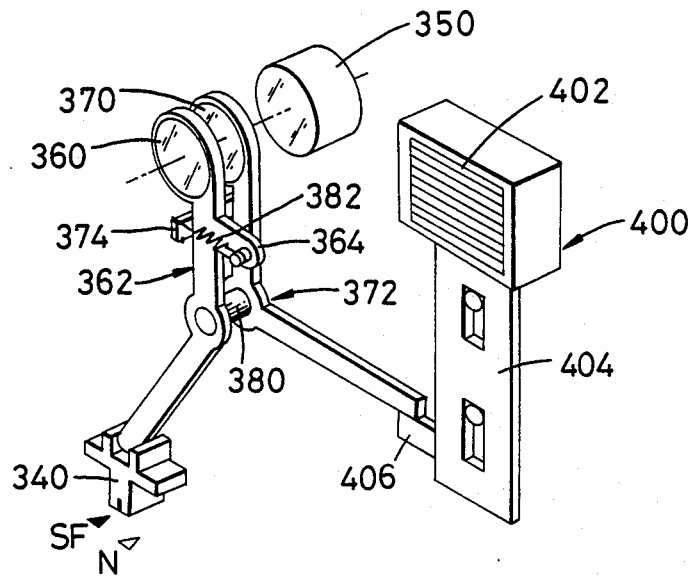
FIG. 24 is a perspective view showing a main part of a modification of the fifth embodiment.

A modification of this embodiment will be described with reference to FIG. 24.

A setting knob 340 is manually operated to select soft-tone photographing and has an engaging groove. When the setting knob 340 is set at a mark SF, soft-tone photographing can be selected. However, when the setting knob 340 is set at a mark N, normal photographing can be selected.

A photographing lens 350, a soft focus filter 360, and a neutral density filter 370 are arranged above the setting knob 340.

The soft focus filter 360 is supported by a support member 362 and the distal end portion of the support member 362 can be engaged with the groove of the knob 340. The support member 362 is supported to be pivotal about a shaft 380 extending in a direction parallel to the optical axis. A projection 364 is formed on an arm connecting the shaft 380 and a frame of the filter 360.

An L-shaped support member 372 for supporting the neutral density filter 370 is rotatably supported by a shaft 380. A projection 374 is formed on one side surface of the support member 372. A spring 382 is hooked between the projection 374 and the projection 364.

A flash unit 400 for illuminating the object includes an emission window 402 and a support plate 404. The support plate 404 is supported by a stationary pin and vertically movable. An engaging portion 406 formed on the support plate 404 is engaged with the distal end of the arm of the support member 372 of the neutral density filter.

The emission window 402 is normally retracted inside a camera housing (not shown) and is popped up from the camera housing in the flash photographing.

In the illustrated state wherein the setting knob 340 is set at the mark SF, the soft focus filter 360 is inserted in the position on the optical axis of the photographing lens 350. At the same time, the neutral density filter 370 is pulled by the spring 382 and inserted into the optical path.

In flash photographing, the principal object is illuminated, but the background is kept dark. The above-mentioned problem, that is, no contrast between the principal object and the background due to a large depth of field, does not occur. Therefore, a soft-tone effect is not lost. In addition, insertion of the neutral density filter in the photographing optical system avoids effective utilization of illumination light from the flash unit. Therefore, when the flash unit is used, only the neutral density filter 370 is removed from the photographing optical system. That is, when the support plate 404 is moved together with the emission window for flash photographing, the engaging portion 406 causes the support member 372 to rotate counterclockwise. Therefore, only the neutral density filter 370 is removed from the photographing optical system.

Insertion of the neutral density filter in the photographing optical system decreases the amount of light passing through the photographing lens. Therefore, a light-receiving element is arranged to receive an amount of light passing through the photographing lens, and the aperture f-number and the shutter time are determined on the basis of an output from the light-receiving element. With this arrangement, in the case of program characteristics shown in FIG. 23, insertion of the neutral density filter decreases the aperture f-number.

In this manner, by inserting the neutral density filter in the photographing optical system upon insertion of the soft focus filter therein, the depth of field can be set to be small without increasing the aperture f-number. Therefore, soft-tone photographing effectively utilizing an out-of-focus image of the background can be achieved.

The soft focus filter provides a unique effect acting on the entire photographing image so as to scatter the light components having a high luminance to the peripheral area in the field of view. Therefore, by shifting the exposure control level to the overexposure side upon insertion of the soft focus filter, a more effective picture can be obtained.

In particular, a circuit is arranged to generate a correction output in response to an output from the detector for detecting insertion of the soft focus filter. The correction output is superposed to the output from the light measuring circuit in the exposure control circuit. The aperture f-number or the shutter time which is actually controlled is updated according to the superposed output. In this case, the aperture value is preferably set to be small (the aperture opening is large) to improve the soft-tone effect by decreasing the depth of field.

For example, some optical elements such as a cross-screen filter produce an image having emphasized high-luminance portions in the field of view. If such an optical element is used, the exposure control level is automatically shifted to an underexposure side, unlike in the soft focus filter.

What is claimed is:

1. A camera comprising:
a photographing optical system for forming an image of an object to be photographed onto a focusing plane;
an optical filter member;
means for holding said optical filter member so that the optical filter may be switched between an insertion position in which the optical filter member is inserted within an optical path of said photographing optical system and a removal position in which the optical filter member is removed from said optical path; and said optical filter member having positive power, and satisfying the following formulae: $B+Ht=D$, and $1/(-D)+1/B=1/F$;
where Ht represents thickness of said optical filter member between a front principal point H1 and rear principal point H2, B and D represent, respectively, distances to said focusing plane from said rear principal point H2 and from said front principal point H1 when said optical filter member is inserted within the optical path of said photographing optical system, and F represents a focal length of said optical filter member.

2. A camera according to claim 1, wherein said optical filter member has one surface which is planar and another surface which is curved, said one surface having a filtering effect.

3. A camera according to claim 2, wherein said optical filter member is disposed between said photographing optical system and said focusing plane and said one surface is opposed to said photographing optical system.

4. In an optical filter member which is used for a camera equipped with a photographing optical system forming an image of an object to be photographed on a focusing plane and is positioned removably within an optical path of said photographing optical system, the improvement comprising:
an optical filter element having positive power and satisfying the following conditions:

$B+Ht=D,$ $1/(-D)+1/B=1/F$ where Ht represents thickness of the optical filter element between a front principal point H1 and a rear principal point H2 thereof,
B and D represent, respectively, distances to said focusing plane from said rear principal point H2 and front principal point H1 in time when said optical filter member is inserted within the optical path of said photographing optical system, and
F represents a focal distance of said optical filter element.

5. A camera according to claim 4, wherein said optical filter element has one surface which is planar and another surface which is curved, said one surface having a filtering effect.

6. A camera according to claim 5, wherein said optical filter element is disposed between said photographing optical system and said focusing plane and said one surface is opposed to said photographing optical system.

7. A camera comprising:
a photographing optical system for forming an image of an object to be photographed;
an optical filter having positive refractive power; and
means for changing-over the position of said optical filter between an insertion position in which said optical filter is inserted within a predetermined space on an optical axis of said photographing optical system and a removal position in which said optical filter is removed from said optical axis;
magnitude of said positive refractive power being determined so that a position of an image formed by said photographing optical system and a position of an image formed by a combination of said photographing optical system and said optical filter are subsequently coincident with each other on said optical axis.

8. A camera according to claim 7, wherein said photographing optical system includes a main lens system and a sublens system removably provided between said main lens system and an image plane for altering a focal length of said photographing optical system, and said optical filter is inserted between said main lens system and said sublens system by said changing-over means.

9. A camera according to claim 7, wherein said optical filter has one surface which is planar and another surface which is curved, said one surface having a filtering effect.

10. A camera according to claim 9, wherein said optical filter is disposed between said photographing optical system and an image plane and said one surface is opposed to said photographing optical system.

* * * * *

UNITED STATES PATENT AND TRADEMARK OFFICE
Certificate

Patent No. 4,825,235                                            Patented: April 25, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Hiroshi Wakabayashi, Hidenori Miyamoto, Masaru Muramatsu and Koichi Wakamiya.

Signed and Sealed this Twenty-fifth Day of December, 1990.

LEE T. HIX

*Supervisory Primary Examiner*
*Art Unit 211*